United States Patent [19]

Ide et al.

[11] Patent Number: 4,790,521
[45] Date of Patent: Dec. 13, 1988

[54] ANTI-VIBRATION APPARATUS FOR MOUNTING A POWER UNIT ON A SUPPORTING BODY WITH SUPPRESSION OF VIBRATIONS

[75] Inventors: Takanobu Ide; Ikuo Shimoda, both of Kanagawa, Japan

[73] Assignees: Nissan Motor Company, Limited, Yokohama; Oiles Industry Company, Limited, Tokyo, both of Japan

[21] Appl. No.: 915,073

[22] Filed: Oct. 3, 1986

[30] Foreign Application Priority Data

Oct. 3, 1985 [JP] Japan .................................. 60-220906
Dec. 6, 1985 [JP] Japan .................................. 60-274834
Dec. 6, 1985 [JP] Japan .................................. 60-274835

[51] Int. Cl.$^4$ .................... F16F 15/04; B60G 15/04; B60K 5/00; F16M 13/00
[52] U.S. Cl. ............................ 267/219; 180/300; 248/562; 267/140.1
[58] Field of Search ............... 267/35, 136, 140.1, 267/140.5, 113, 152, 153, 217, 219, 292, 218; 188/298, 268, 322.5; 248/562, 636, 638; 180/300, 312; 123/192 R

[56] References Cited

U.S. PATENT DOCUMENTS 3,202,412  8/1965  Trask .............................. 188/268 X
4,576,366  3/1986  Gallas et al. ................. 267/140.1 X

FOREIGN PATENT DOCUMENTS 57-25536  2/1982  Japan .

Primary Examiner—Andres Kashnikow
Assistant Examiner—Robert J. Oberleitner
Attorney, Agent, or Firm—Foley & Lardner, Schwartz, Jeffery, Schwaab, Mack, Blumenthal & Evans

[57] ABSTRACT

An apparatus for damping a plurality of vibrations applicable to an apparatus for mounting a vehicular engine on a vehicle body. The apparatus comprises: (a) a first block; (b) a second block; (c) a block member for damping first vibrations having high frequencies and having large amplitudes, the first vibrations being generated and transmitted from the first block to the second block; and (d) at least one viscous shearing force resistance generator for damping second vibrations having low frequencies and large amplitudes, the second vibrations being generated and transmitted from the first block to the second block and from the second block to the first block. The viscous shearing force resistance generator is formed within the block member. The viscous shearing force resistance generator, e.g., comprises: (a) a cavity formed within the block member; (b) a viscous fluid having a high viscosity filled within the cavity; and (c) at least one shearing resistant element disposed within the cavity with minute gaps against the opposing inner wall surfaces of the cavity.

20 Claims, 13 Drawing Sheets

FIG.25
FIG.26
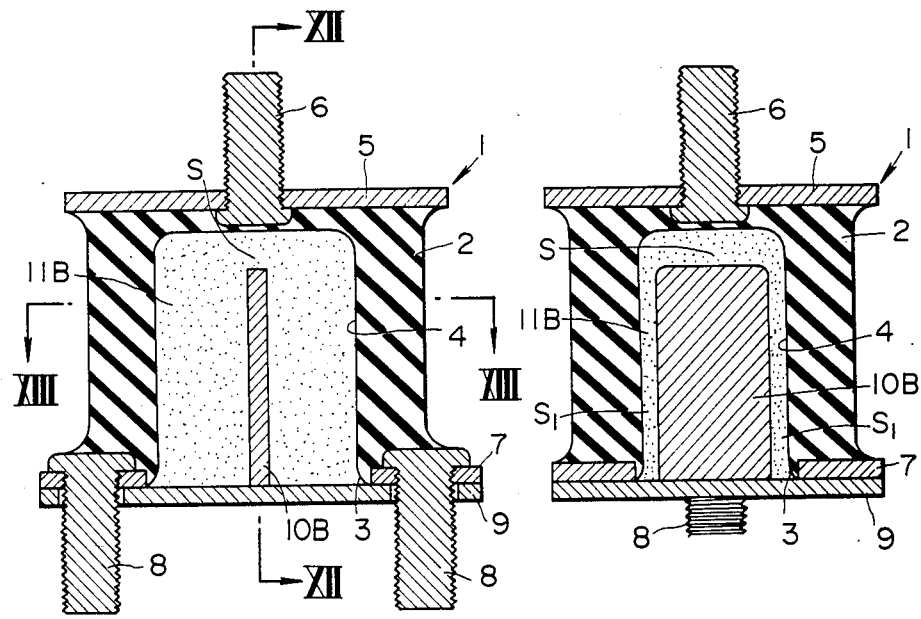
FIG.27
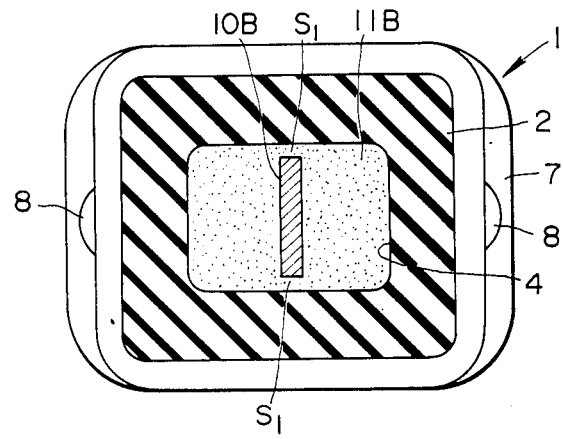

ANTI-VIBRATION APPARATUS FOR MOUNTING A POWER UNIT ON A SUPPORTING BODY WITH SUPPRESSION OF VIBRATIONS

BACKGROUND OF THE INVENTION

1. Field of the Invention

The present invention relates to an apparatus for damping various vibrations particularly applicable to an apparatus for mounting a vehicular engine on a vehicle body.

2. Description of the Prior Art

The following characteristics are generally required for vehicular engine mounting apparata:

(1) reduction of transmission of low frequency vibrations generated from a vehicular engine to a vehicle body having large amplitudes (displacements) when the engine is cranked and in an idling state or when the vehicle is abruptly started by damping such low-frequency vibrations through the apparatus;

(2) prevention of a resonance of the engine due to the receipt of large-amplitude, low-frequency vibrations transmitted to the engine through a vehicle body from a road surface which has recesses and convexes by damping the large-amplitude, low-frequency vibrations when the vehicle runs on such a rough road; and (3) suppression of increase in noise within a vehicle compartment due to a propagation of small-amplitude, high-frequency vibrations to the vehicle compartment by damping the small-amplitude and high-frequency vibrations generated by the engine when the vehicle runs at a high speed.

A fluid-sealed type vehicular engine mounting apparatus has recently been proposed in which is incorporated a hydraulic damping mechanism acting upon a change in a height of an elastic object intervened between the engine and vehicle body. The above-described fluid-sealed type engine mounting apparatus is exemplified by a Japanese Patent Application Unexamined Open No. Sho 57-25536, published on Feb. 10, 1982.

FIG. 1 shows a conventional fluid-sealed type vehicular engine mounting apparatus.

In FIG. 1, a metal fixture a is attached to the vehicular engine via a bolt b. On the other hand, another metal fixture c is attached to a body frame constituting the vehicle body via other bolts d. A hollow rubber mount e is intervened between the metal fixtures a and c. An upper end of the rubber mount e is vulcanized and adhered to the metal fixture a and a lower end thereof is vulcanized and adhered to the metal fixture c. A partitioning plate g and diaphragm h are attached to the metal fixture c via a holding fixture f. A first chamber $i_1$ ' is formed on an upper side of the partitioning plate g and a second chamber $i_2$ ' is formed on a lower side of the partitioning plate g. An operating fluid j is filled within both chambers $i_1$ ' and $i_2$ '.

An orifice k is penetrated through the partitioning plate g for communicating both chambers $i_1$ ' and $i_2$ '. The small orifice k is formed within an envelope λ fixed to a substantially center part of the partitioning plate g.

The fluid-sealed type vehicular engine mounting apparatus having a structure as described above with reference to FIG. 1 damps the engine vibrations by the utilization of the orifice k when the mount rubber member e is deformed due to the engine vibrations, accordingly the volume of the first chamber i1 ' is changed, and the operating fluid j moves between both chambers $i_1$ ' and $i_2$ ' via the orifice k of the envelope λ.

In the conventional engine mounting apparatus which starts action of the hydraulic damping mechanism simultaneously when the height of the mount rubber member e is changed (the change in volume of the chambers $i_1$ ', $i_2$ ', the change in a spring constant of the mount rubber member e is proportional to the change in the damping force. Therefore, if the spring constant of the mount rubber member e is set larger so as to sufficiently damp the large-amplitude, low-frequency vibrations, the damping force becomes excessive for the small-amplitude, high-frequency vibrations so that the small-amplitude, high-frequency vibrations cannot sufficiently be damped. On the contrary, if the spring constant of the mount rubber member e is set lower so as to sufficiently damp the small-amplitude, high-frequency vibrations, the large-amplitude, low-frequency vibrations cannot sufficiently be damped.

In this way, the setting of the spring constant for the rubber mount e largely affects the capability of damping various vibrations that the engine mounting apparatus needs to have.

In addition, since pressure is generated in the sealed fluid in the hollow portion of the rubber mount e, the pressure generation affects a durability of the rubber mount e itself and the mounting apparatus itself becomes complex and large in construction.

SUMMARY OF THE INVENTION

With the above-described problems in mind, it is an object of the present invention to provide an apparatus for mounting a vehicular engine on a vehicle body which satisfies the above-described characteristic requirements.

It is another object of the present invention to provide the apparatus for mounting the vehicular engine having a sufficient durability.

It is still another object of the present invention to provide the compacted apparatus for mounting the vehicular engine in relatively simple structure.

The above-described objects can be achieved by providing an apparatus comprising: (a) a first block; (b) a second block; (c) first means for damping vibrations in a first frequency range generated and transmitted from the first block to the second block so as to suppress increase in noise in the second block; and (d) second means for damping vibrations in a second frequency range lower than the first frequency range and having amplitudes larger than the vibrations in the first frequency range so as to reduce propagation of the vibrations in the second frequency range from the first block to the second block and so as to prevent a resonance of the first block due to the propagation of the vibrations in the second frequency range from the second block to the first block.

The first means preferably comprises a rubber block member having a cavity therein and intervened between the first and second blocks for elastically supporting the first block, e.g., engine body on the second block, e.g., vehicle body. In addition, the second means preferably comprises means for generating a viscous resistance force against a shearing of the block member when the block member is sheared. The second means is constituted by a viscous fluid having a high viscosity and shearing resistance elements(s).

The resistance element is preferably formed of an elastic body of rubber or of a spring steel plate. In a preferred embodiment, the resistance element is integrally formed by vulcanizing and fixing it to a block plate enclosing the cavity.

The viscous fluid heremetically sealed within the cavity has a viscosity of 10,000 through 100,000 poise and is preferably made of polysiloxane or polyolefin class.

The viscous fluid is present in a minute space between the resistance element and opposing wall surface of the cavity. When a relative displacement between the resistance element and wall surface of the cavity occurs at a constant speed, a resistance force of the viscous fluid against a shearing of the block member depends on a vibration frequency transmitted therethrough. That is to say, the viscous fluid has a characteristic such that a resistance force at a high vibration frequency indicates an extremely low value as compared with that at a low vibration frequency, in order words, such that the resistance force against a large-amplitude (displacement), low-frequency vibration indicates an extremely larger value than that against a small-amplitude high-frequency vibration.

The above-described characteristic of the viscous fluid having the high viscosity coincides well with one of the characteristics required for vehicular engine mounting apparata.

The above-described second means may alternatively comprise a plurality of viscous shearing resistance generators with a weight of the engine mounted on the vehicular engine mounting apparatus, spring constant of the rubber block member, and so on taken into account.

In the case where the resistance element is formed of a plate material, the vehicular engine mounting apparatus is attached between the engine and vehicle body with an elongated plate surface of the plate material orthogonal to or aligned an axial direction of an engine roll axle.

In a preferred embodiment, the second means is constituted by a viscous fluid having a high viscosity, a plurality of shearing resistance members overlapped with each other with mutual minute gaps between the adjacent resistance members, and a spring element for elastically holding the resistance members within the cavity of the block member. The spring element comprises leaf springs or coil springs and each resistance member comprises a solid body having a hollow or no hollow in a substantially elliptical shape in a longitudinal section and made of a steel or synthetic resin.

BRIEF DESCRIPTION OF THE DRAWINGS

FIG. 25 is a cross sectional view of the vehicular engine mounting apparatus of an eighth preferred embodiment according to the present invention;

FIG. 26 is a cross sectional view of the vehicular engine mounting apparatus cut away along a line XII—XII in FIG. 25;

FIG. 27 is a cross sectional view of the vehicular engine mounting apparatus cut away along a line XIII—XIII in FIG. 25;

DETAILED DESCRIPTION OF THE PREFERRED EMBODIMENTS

Reference will hereinafter be made to the drawings in order to facilitate understanding of the present invention.

The characteristics required for an apparatus for mounting a vehicular engine on a vehicle body have already been described.

FIRST PREFERRED EMBODIMENT

FIGS. 2 through 5 show a first preferred embodiment of the vehicular engine mounting apparatus.

Figure 1:
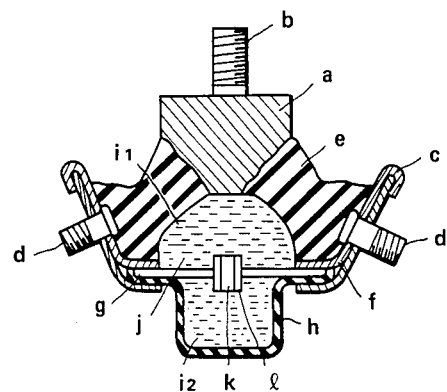
FIG. 1 is a cross sectional view of a conventional vehicular engine mounting apparatus disclosed in a Japanese Patent Application Unexamined Open No. Sho 57-25536.
Figure 2:
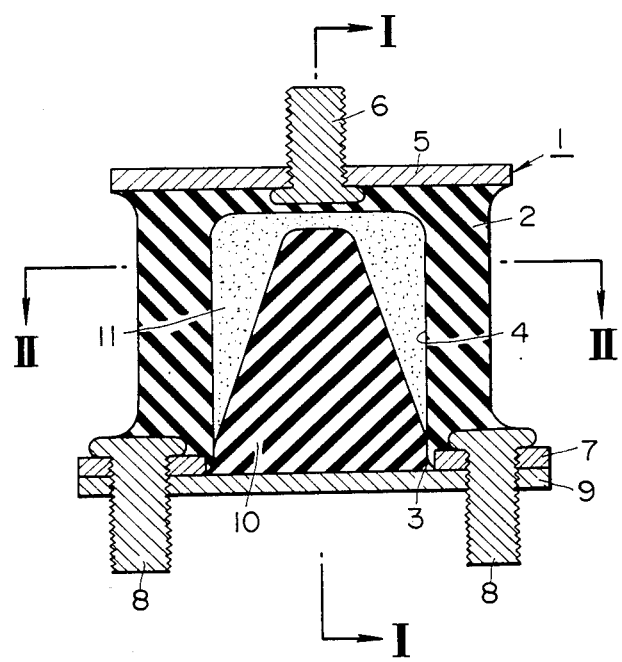
FIG. 2 is a cross sectional view of a vehicular engine mounting apparatus of a first preferred embodiment according to the present invention.

The vehicular engine mounting apparatus 1 includes a block member 2 made of a rubber and having a cavity 4 therein whose longitudinal section is substantially in a rectangular shape as shown in FIG. 2 and whose one end has an opening 3. In addition, an attachment plate 5 is fixed to the other end of the rubber block member 2 which has been vulcanized. A bolt 6 is penetrated through and projected upwardly from the attachment plate 5. The attachment plate 5 and bolt 6 constitute an engine side attachment member.

Another attachment plate 7 is fixed to the one end of the opening 3 of the cavity 4 which has been vulcanized so as to enclose the cavity 4 of the rubber block member 2. Bolts 8, 8 are opposed to each other and fixed to the attachment plate 7 whose respective ends project downwardly in the same direction as the opening 3 of the cavity 4 is directed from the attachment plate 7.

In addition, a block plate 9 encloses the opening 3 of the cavity 4 and is fixed to the attachment plate 7 located at the vehicle body side. The block plate 9 serves to close the opening 3 of the cavity 4 so as to hermetically seal a viscous fluid to be described later. The attachment plate 7, bolts 8, 8, and block plate 9 constitute a vehicle body side attachment member.

It is noted that a shearing resistance plate 10 made of an elastic material, i.e., a rubber is installed within the cavity 4 and the resistance plate 10 as a shearing resistance element has a substantially trapezoidal form in a longitudinal section. A lower bottom end of the resistance plate 10 is vulcanized and adhered to the block plate 9.

Figure 3:
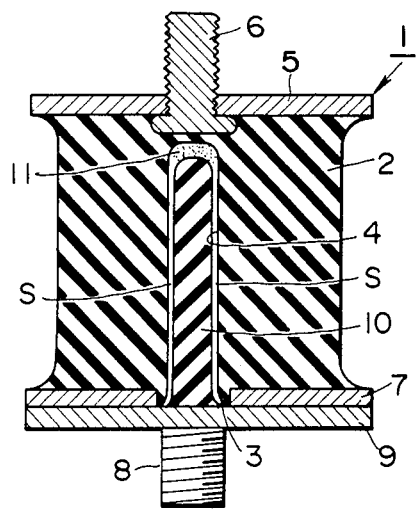
FIG. 3 is a cross sectional view of the vehicular engine mounting apparatus cut away along a line I—I in FIG. 2.
Figure 4:
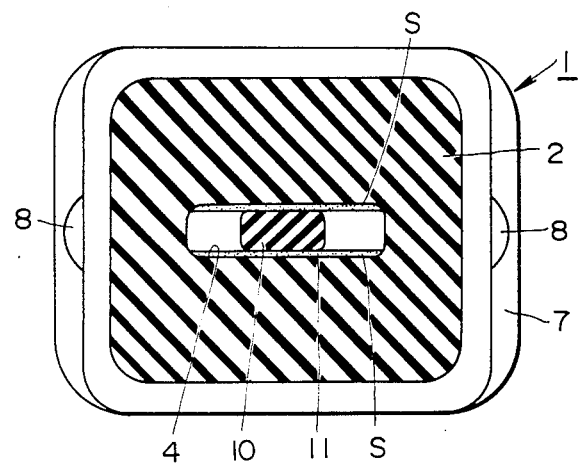
FIG. 4 is a cross sectional view of the vehicular engine mounting apparatus cut away along a line II—II in FIG. 2.

The shearing resistance plate 10 is inserted within the cavity 4 of the rubber block member 2 with trapezoidal plate surfaces of the resistance plate 10 faced against respective rectangular side wall surfaces of the cavity 4 with minute gaps S, S as shown in FIG. 3 and FIG. 4.

It is also noted that the viscous fluid having a high viscosity preferably of 10,000 through 100,000 poise is hermetically sealed and filled within the cavity 4.

The resistance plate 10 within the cavity 4 and the viscous fluid 11 having the high viscosity intervened within the minute gaps S, S between both opposing wall surfaces of the resistance plate 10 and cavity 4 constitute a viscous shearing resistance generator.

The vehicular engine mounting apparatus 1 having the construction described above is fixed between the engine body E and vehicle body B with the trapezoidal plate surfaces of the resistance plate 10 orthogonal to an axial direction of an engine roll axle (not shown).

Figure 5:
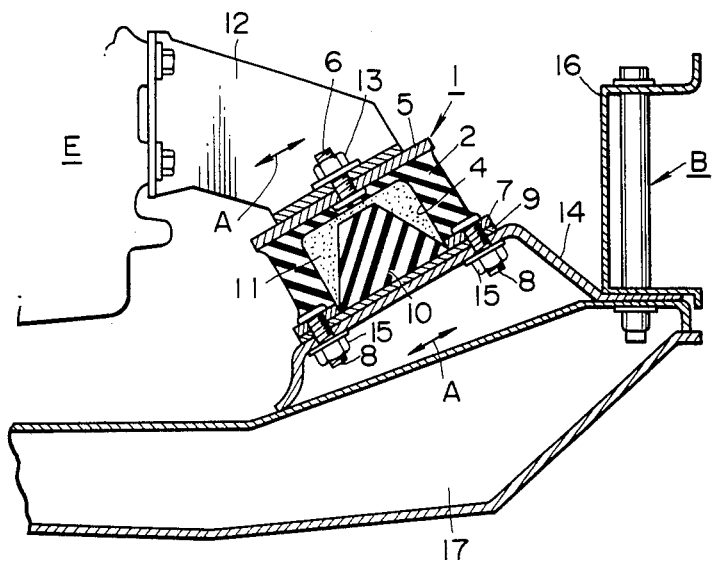
FIG. 5 is a cross sectional view of the vehicular engine mounting apparatus shown in FIG. 2 through FIG. 4 attached between the engine and vehicle body frame.
Figure 6:
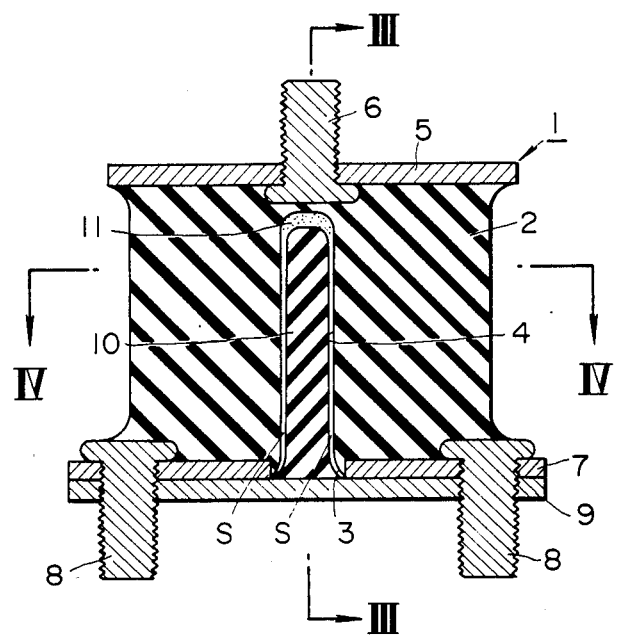
FIG. 6 is a cross sectional view of the vehicular engine mounting apparatus of a second preferred embodiment according to the present invention.
Figure 7:
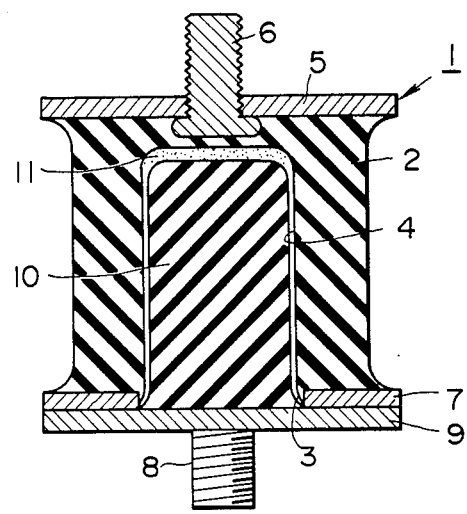
FIG. 7 is a cross sectional view of the vehicular engine mounting apparatus cut away along a line III—III in FIG. 6.

That is to say, as shown in FIG. 5, the attachment plate 5 fixed to one end of the rubber block member 2 is fixed to a bracket 12 fixed to the engine E by means of the bolt 6 and nut 13. The attachment plate 7 fixed to the other end of the rubber block member 2 so as to enclose the cavity 4 and block plate 9 fixed to the attachment plate 7 are fixed to a bracket 14 at the vehicle body side by means of the bolts 8, 8 and nuts 15, 15.

Then, the bracket 14 at the vehicle body side is fixed on an upper surface of a suspension frame 17 suspended on a side member 16 of the vehicle body B and the engine E is elastically supported on the engine mounting apparatus 1 in an inverted letter V shape.

In the first preferred embodiment, if vibrations having low frequencies with large amplitudes are generated at the engine E due to a rolling motion of the engine E or generated at the suspension frame 17 of the vehicle body B due to recesses and convexes on the road surface, large relative displacements are generated along arrow-marked directions denoted by A in FIG. 5 between the engine E and suspension frame 17.

The large relative displacements described above cause the rubber block member 2 to be sheared so that relative displacements are then generated having directions along the trapezoidal plate surfaces of the resistance plate 10 between rectangular side wall surfaces of the cavity 4 formed on the rubber block member 2 and trapezoidal plate surfaces of the resistance plate 10.

Since the above-described gaps S, S between the rectangular wall surfaces of the cavity 4 and plate surfaces of the resistance plate 10 have the viscous fluid 11 having the high viscosity, a viscous shearing resistance force is generated thereat so that the large-amplitude, low-frequency vibrations are remarkably damped due to the resistance force.

SECOND PREFERRED EMBODIMENT

FIGS. 6 through 9 show a second preferred embodiment of the vehicular engine mounting apparatus 1.

In the vehicular engine mounting apparatus 1, the opposing bolts 8, 8 are fixed to the attachment plate 7 with elongated sides of the cavity 4 of the rubber block member 2 in a substantially rectangular shape in the longitudinal section sandwiched. In this embodiment, the shearing resistance plate 10 inserted and fitted into the cavity 4 of the rubber block member 2 with minute gaps S, S is substantially in a quadrangular prism.

Figure 9:
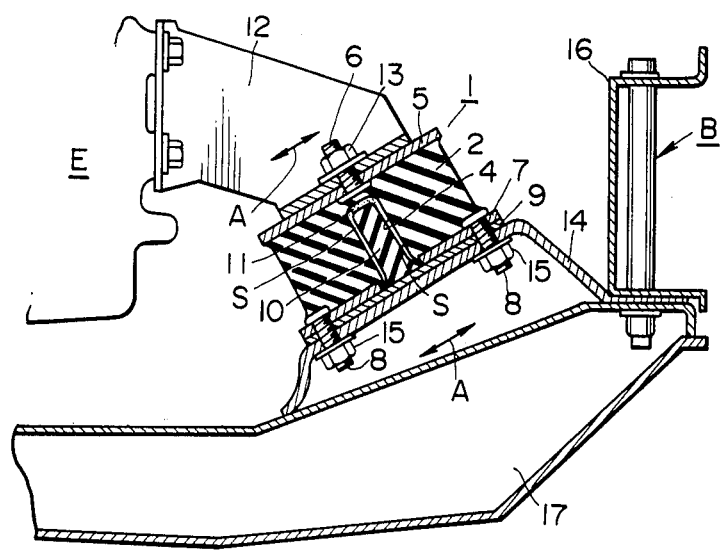
FIG. 9 is a cross sectional view of the vehicular engine mounting apparatus attached between the engine and vehicle body frame.

The vehicular engine mounting apparatus 1 in the second preferred embodiment is fixed between the engine E and vehicle body B with the opposing rectangular plane surfaces of the resistance plate 10 aligned with the axial direction of the engine roll axis, as shown in FIG. 9.

In the second preferred embodiment, the viscous shearing resistance force damps large-amplitude, low-frequency vibrations which are generated at the suspension frame 17 of the vehicle body B due to recesses and convexes on the road surface or generated at the engine E due to a rolling motion of the engine E.

The rubber block member 2 is at this time sheared due to relative displacements along the directions denoted by A generated between the engine E and suspension frame 17. Thereafter, relative displacements of deviations in the elements constituting the mounting apparatus are generated along the directions of the rectangular plane surfaces of the resistance plate 10 between the elongated wall side surfaces of the cavity 4 of the rubber block member 2 and rectangular plane surfaces of the resistance plate 10 inserted within the cavity.

Since the viscous fluid 11 having the high viscosity is intervened within the minute gaps S, S between the elongated side wall surfaces of the cavity 4 and rectangular plate surfaces of the shearing resistance plate 10, the viscous shearing resistance force is generated thereat so that the large-amplitude low-frequency vibrations are remarkably damped by means of the resistance force.

THIRD PREFERRED EMBODIMENT

Figure 10:
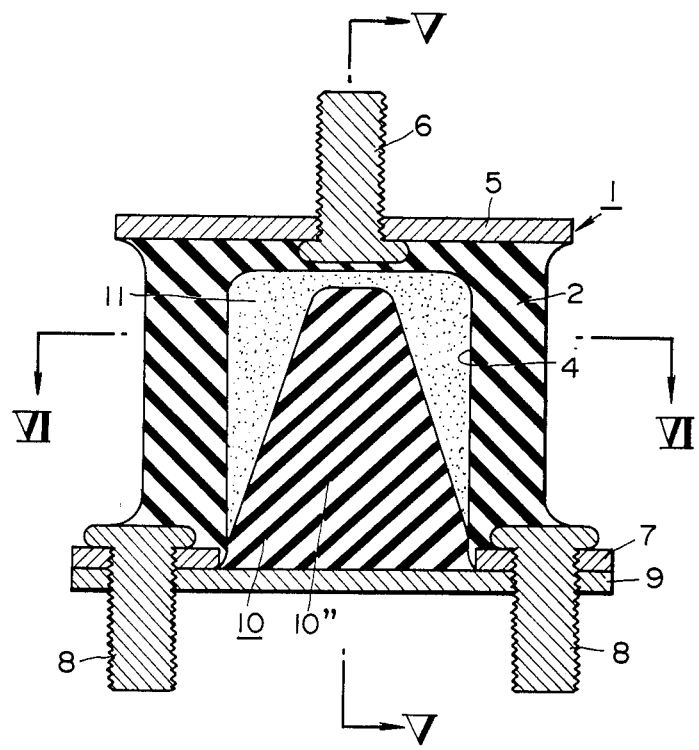
FIG. 10 is a cross sectional view of the vehicular engine mounting apparatus of a third preferred embodiment according to the present invention.
Figure 11:
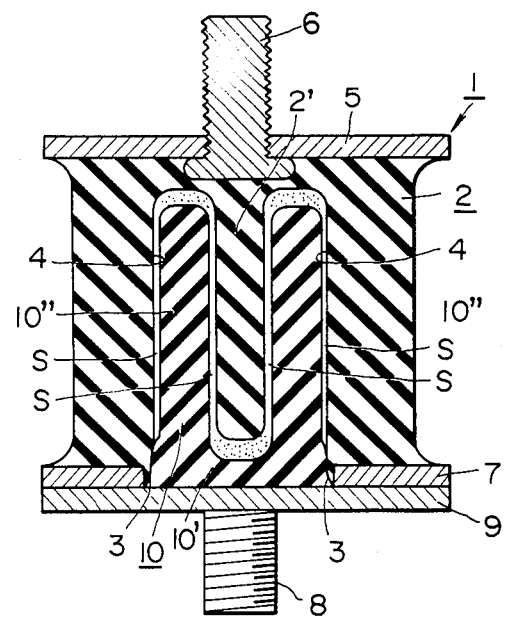
FIG. 11 is a cross sectional view of the vehicular engine mounting apparatus cut away along a line V—V in FIG. 10.
Figure 12:
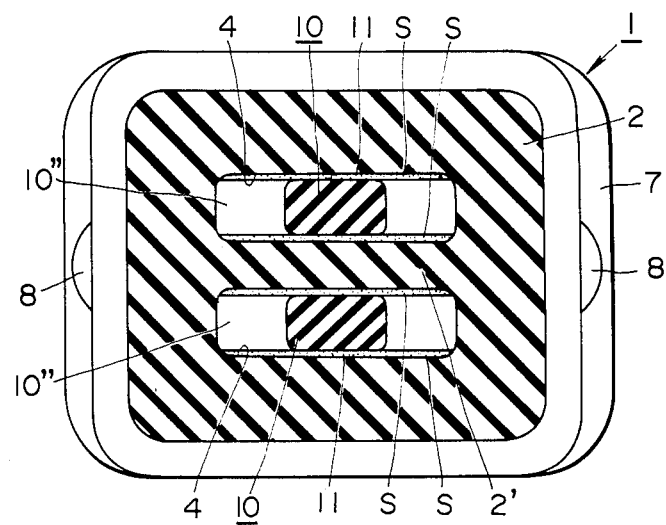
FIG. 12 is a cross sectional view of the vehicular engine mounting apparatus cut away along a line VI—VI in FIG. 10.

FIGS. 10 through 12 show a third preferred embodiment according to the present invention.

In the third preferred embodiment, the vehicular engine mounting apparatus 1 is provided with two viscous shearing resistance generators to be described later.

That is to say, the two partitioned cavities 4, 4 having substantially rectangular shapes in the longitudinal section and having openings 3, 3 at one end thereof are spaced apart from each other via a downwardly extended partitioning portion 2' of the block member 2 and are mutually communicated at the openings 3, 3 as shown in FIG. 11.

The shearing resistance plate 10 includes a curved section 10' curved substantially in a letter U shape at a center thereof and trapezoidal plane sections 10" integrally formed at both sides of the curved section 10'. The resistance plate 10 is vulcanized and adhere to the block plate 9 at the curved section 10'.

The resistance plate 10 is sandwiched via the partitioning portion 2' of the cavities 4, 4 and the trapezoidal plane sections 10" thereof are inserted into the cavities 4, 4 with minute gaps S, S, S, S held between the plate surfaces of the trapezoidal plane sections 10", 10" and elongated side wall surfaces of the cavities 4, 4.

The bolts 8, 8 are fixed to the attachment plate 7 fixed to the cavity openings 3 which have been vulcanized, 3 at mutually opposing positions in the elongated directions of the cavities 4, 4. Consequently, the same mounting form can be taken as shown in FIG. 5.

FOURTH PREFERRED EMBODIMENT

Figure 13:
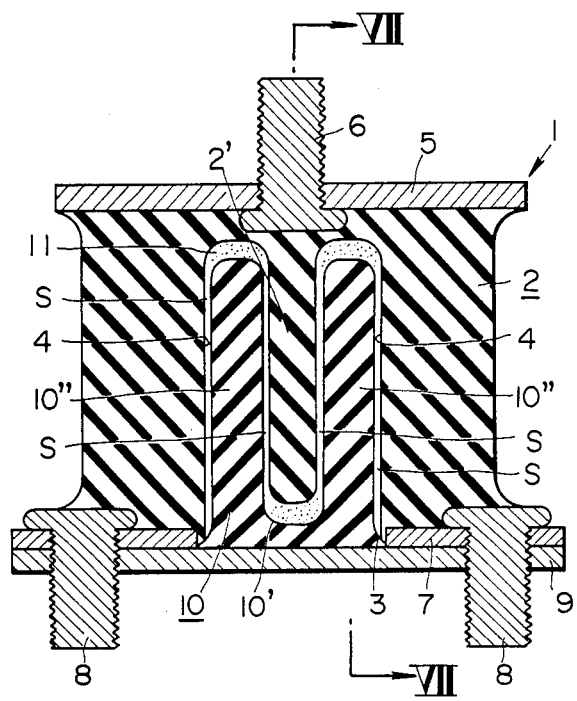
FIG. 13 is a cross sectional view of the vehicular engine mounting apparatus of a fourth preferred embodiment according to the present invention.
Figure 14:
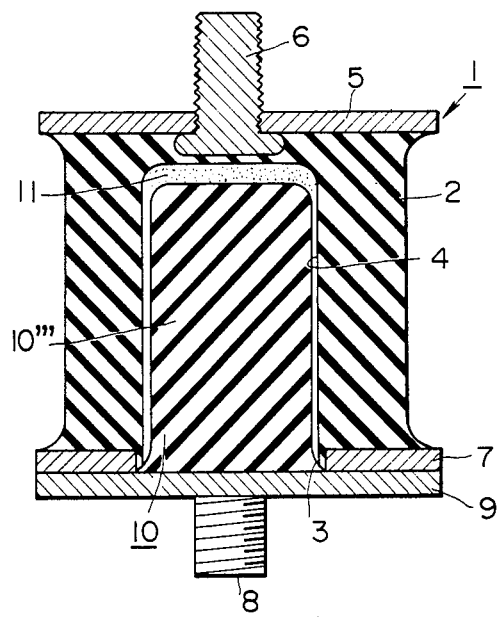
FIG. 14 is a cross sectional view of the vehicular engine mounting apparatus cut away along a line VII—VII in FIG. 13.

FIGS. 13 and 14 show a fourth preferred embodiment.

In the vehicular engine mounting apparatus 1 in which the two viscous shearing resistance generator sections are provided as shown in FIGS. 13 and 14, the opposing bolts 8, 8 are fixed to the attachment plate 7 with the elongated sides of the cavities 4, 4 sandwiched.

Consequently, the same mounting form can be taken as shown in FIG. 9.

Figure 8:
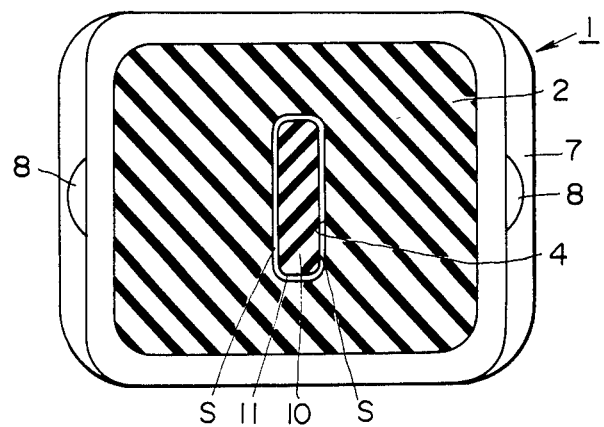
FIG. 8 is a cross sectional view of the vehicular engine mounting apparatus cut away along a line IV—IV in FIG. 6.

It should be noted that in the case of the mounting form shown in FIG. 8, the resistance plate 10 has substantially rectangular plane sections 10''', 10''' in place of the above-described trapezoidal plane sections 10", 10".

FIFTH PREFERRED EMBODIMENT

Figure 15:
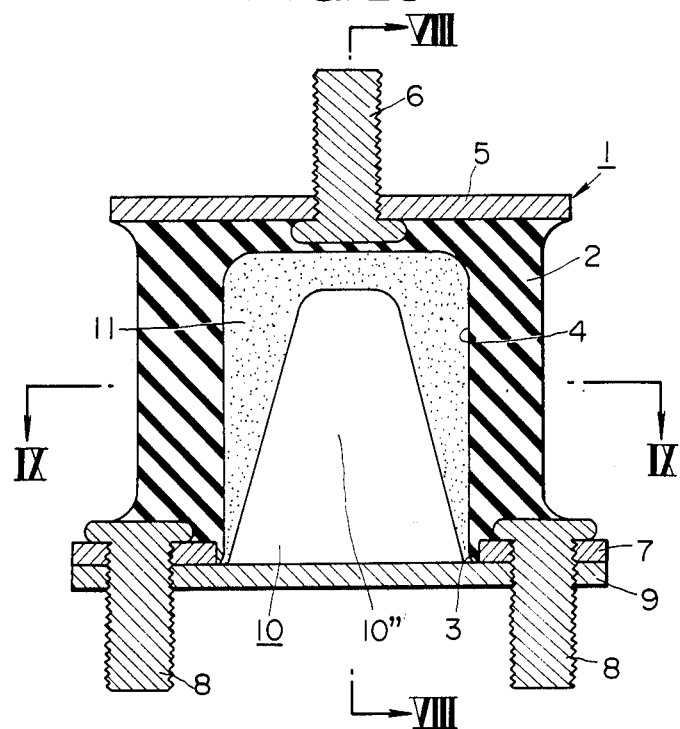
FIG. 15 is a cross sectional view of the vehicular engine mounting apparatus of a fifth preferred embodiment according to the present invention.
Figure 16:
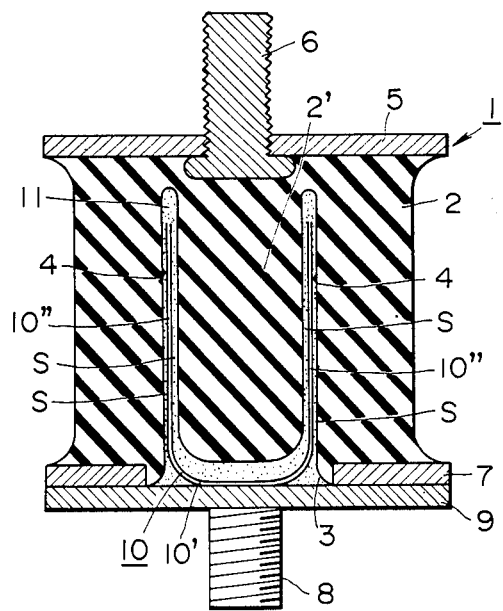
FIG. 16 is a cross sectional view of the vehicular engine mounting apparatus cut away along a line VIII—VIII in FIG. 15.
Figure 17:
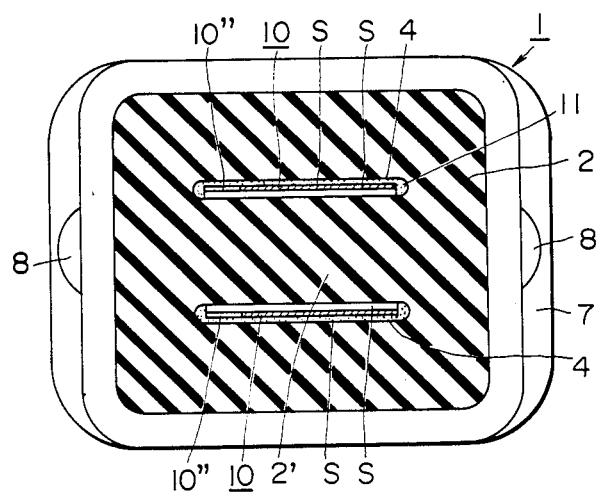
FIG. 17 is a cross sectional view of the vehicular engine mounting apparatus cut away along a line IX—IX in FIG. 15.

FIGS. 15 through 17 show a fifth preferred embodiment.

In the fifth preferred embodiment, the construction of the vehicular engine mounting apparatus 1 is substantially the same as that in the third preferred embodiment shown in FIGS. 10 through 12.

However, in this embodiment, the shearing resistance plate 10 is made of a spring steel plate as the shearing resistance element. It is noted that the resistance plate 10 made of the spring steel plate is welded to the block plate 9 at its curved section 10'. Since in the third through fifth preferred embodiments shown in FIG. 10, FIG. 13, and FIG. 15, the two viscous shearing resistance generator sections constituted by the wall surfaces of the resistance plate 10, the cavities 4, and viscous fluid 11 having the high viscosity, a higher damping action can be achieved against the large-amplitude, low-frequency vibrations generated at the engine E or vehicle body B.

It is noted that the opening(s) 3 may alternatively be provided at the attachment member side facing the engine for all preferred embodiments.

SIXTH PREFERRED EMBODIMENT

FIGS. 18 through 21 show a sixth preferred embodiment.

Figure 18:
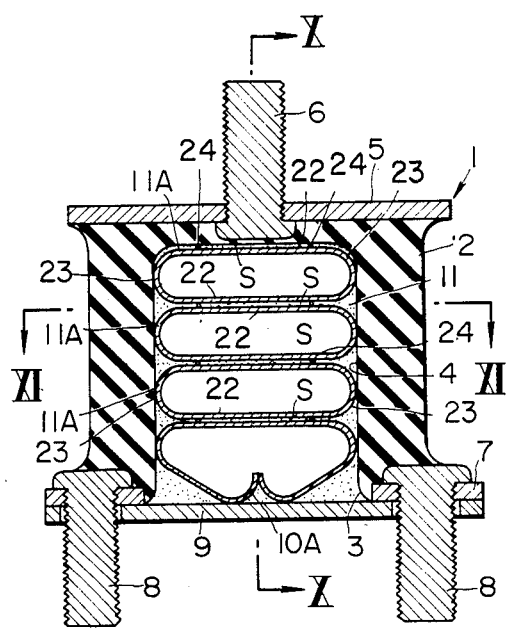
FIG. 18 is a cross sectional view of the vehicular engine mounting apparatus of a sixth preferred embodiment according to the present invention.
Figure 19:
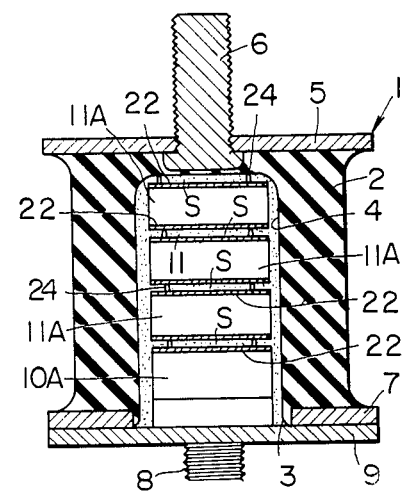
FIG. 19 is a cross sectional view of the vehicular engine mounting apparatus cut away along a line X—X in FIG. 18.

In the sixth embodiment, the block plate 9 serves to hermetically seal the cavity 4 and the attachment member located on the vehicle body B is constituted by the bolts 8, 8, block plate 9, and attachment plate 7. However, the bolts 8, 8 may be fixed to the block plate 9 and the block plate 9 may directly be fixed to the rubber block member 2 which has been vulcanized at its fixing part. In FIGS. 18 and 19, numberal 10A denote a spring element as the shearing resistance element disposed within the cavity 4 of the rubber block member 2. Furthermore, numeral 11A denotes shearing resistance members overlapped on the spring element 10A. Each of the resistance members 11A has a flat section 22 at its upper and lower surfaces and comprises a hollow solid body of a substantially elliptical shape in the longitudinal section having convex portions 23 at both ends of its flat section 23. Each resistance member 11A is elastically supported within the cavity 4 by means of the corresponding spring element 10A with the convex section 23 contacted with the opposing wall surface of the cavity 4.

Each resistance member 11A is manufactured in such a way that a steel plate in a substantially rectangular shape is wound or a steel pipe is deformed under compression.

Furthermore, a plurality of projections 24 are formed on one flat section 22 of each resistance member 11A. Such a plurality of projections 24 serve to form minute gaps S between each resistance member 11A when each of the resistance members 11A is overlapped on the other adjacent resistance member 11A. It is noted that in the sixth embodiment of FIGS. 18 through 21 numeral 11 denotes the viscous fluid having the high viscosity.

In the vehicular engine mounting apparatus 1 of the sixth embodiment, the viscous shearing resistance generator section is constituted by the plurality of the shearing resistance members 11A mutually overlapped with respective minute gaps S within the cavity 4 of the rubber block member 2, the viscous fluid 11 having the high viscosity, and spring element 10A.

Figure 20:
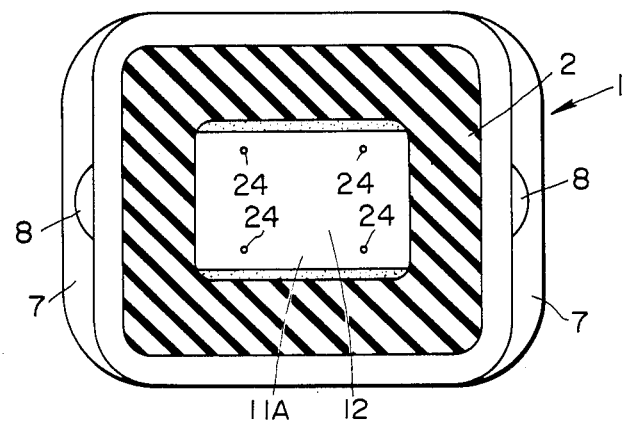
FIG. 20 is a cross sectional view of the vehicular engine mounting apparatus cut away along a line XI—XI in FIG. 18.
Figure 21:
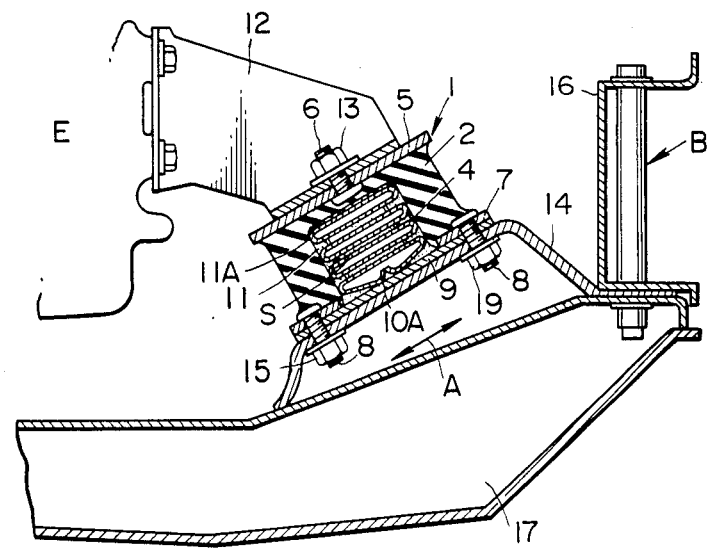
FIG. 21 is a cross sectional view of the vehicular engine mounting apparatus attached between the engine and vehicle body frame.

FIG. 21 shows the vehicular engine mounting apparatus 1 of the sixth preferred embodiment shown in FIGS. 18 through 20 when it is actually installed between the engine E and vehicle body B.

As shown in FIG. 21, the two bolts 8 fixed to the attachment plate 7 located on the vehicle body B are positioned so as to traverse the engine roll axis (not shown) of the engine. The attachment plate 5 attached to one end of the rubber block member 2 is fixed to a bracket 12 attached to the engine E by means of the bolt 6 and nut 13. The block plate 9 fixed to the attachment plate 7 is fixed to a bracket located at the vehicle body B by means of the bolts 8, 8 and nuts 15, 15 together with the attachment plate 7.

The bracket 14 located at the vehicle body side is fixed on the upper surface of the suspension frame denoted by 17 in FIG. 21 suspended on a side member 16 of the vehicle body B and, on the other hand, the engine E is elastically supported in the inverted letter V shape on the engine mounting apparatus 1.

If the large-amplitude, low-frequency vibrations are generated at the engine body E due to a rolling motion of the engine E or generated at the suspension frame 17 of the vehicle body B due to recesses and convexes on the road surface, large relative displacements occur with respect to directons denoted by A between the engine body E and suspension frame 17. such relative dislacement cause the rubber block member 2 of the engine mounting apparatus 1 to shear and shearing direction deviative displacements are accordingly generated between the resistance members 11A arranged within the cavity with mutual minute gaps S. Since the viscous fluid 11 having the high viscosity is present in the respective minute gaps S, the viscous shearing resistance force is generated against such relative displacements so that the above-described low-frequency vibrations are remarkably damped due to the resistance force.

SEVENTH PREFERRED EMBODIMENT

Figure 22:
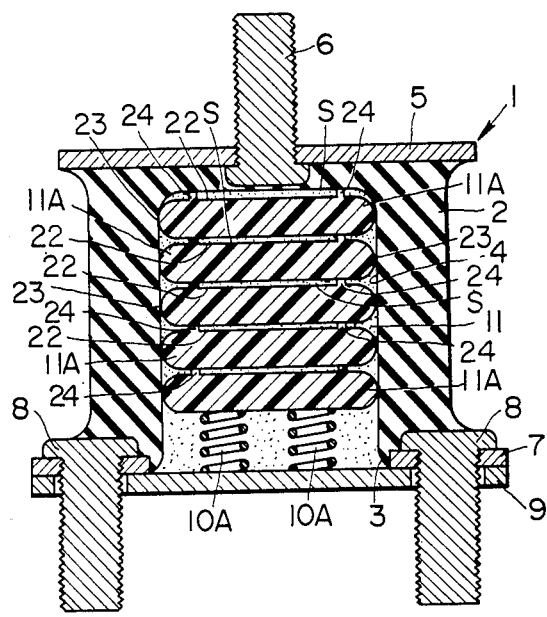
FIG. 22 is a cross sectional view of the vehicular engine mounting apparatus of a seventh preferred embodiment according to the present invention.

FIGS. 22 shows a seventh preferred embodiment.

Figure 23:
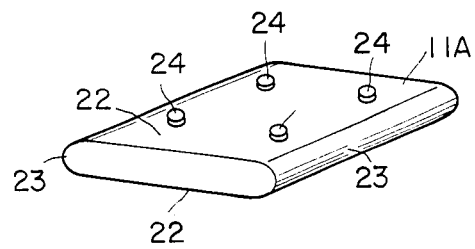
FIG. 23 is a perspective view of a resistance element used in the vehicular engine mounting apparatus shown in FIG. 22.

In the seventh preferred embodiment, coil springs are used as the spring element 10A disposed within the cavity 4. In addition, each resistance member 11A overlapped on the spring element 10A is formed of a solid body without hollow made of synthetic resin having the purality of projections 24, as shown in FIG. 23.

Figure 24:
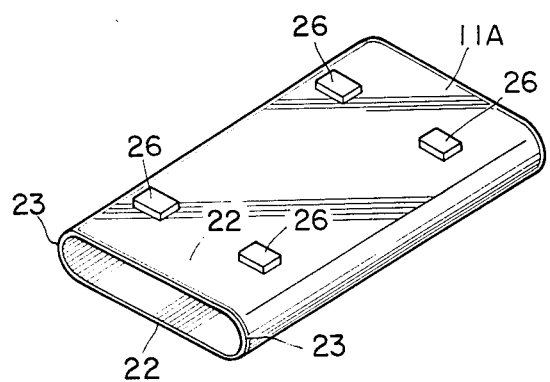
FIG. 24 is a perspective view of another resistance element used in the vehicular engine mounting apparatus shown in FIG. 22.

FIG. 24 shows a modification of each resistance member 11A used in the seventh preferred embodiment shown in FIG. 22.

As shown in FIG. 24, substantially box-shaped spacers 26 are integrally attached on one flat section 22 of each resistance member 11A. The spacers 26 serve to form minute gaps S between the mutually adjacent resistance members 11A.

EIGHTH PREFERRED EMBODIMENT

FIGS. 25 through 28 show an eighth preferred embodiment.

In FIGS. 25 through 28, a partitioning plate 10B is disposed within the cavity 4 of the rubber block member 2 and its lower end is fixed to the block plate 9. Both flat plate surfaces of the partitioning plate 10B face against the corresponding bolts 8, 8 fixed to the attachment plate 7. In addition, an upper end of the partitioning plate 10B faces against a bottom surface of the cavity 4 with a minute gap S as shown in FIGS. 25 and 26 and both side surfaces thereof face against wall surfaces of the cavity 4 with minute gaps $S_1$', $S_1$ 'as shown in FIG. 27. Numeral 11B denotes the hermetically sealed viscous fluid having the high viscosity as described in the previous preferred embodiments.

Figure 28:
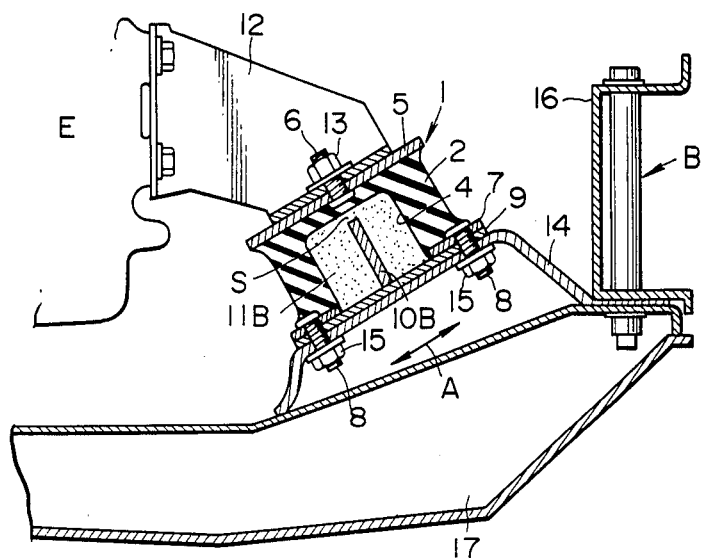
FIG. 28 is a cross sectional view of the vehicular engine mounting apparatus attached between the engine and vehicle body frame.

As shown in FIG. 28, the vehicular engine mounting apparatus 1 is attached between the engine body E and vehicle body B, with the opposing elongated flat plate surfaces of the partitioning plate 10 disposed within the cavity 4 of the rubber block member 2 aligned with the axial direction of the engine roll axis (not shown).

The attachment plate 5 fixed to one end of the rubber block member 2 is fixed to a bracket fixed to the engine body E by means of fasteners such as the bolt 6 and nut 13. On the other hand, the attachment plate 7 fixed so as to enclose the openings 3, 3 of the cavity 4 and block plate 9 are fixed to a bracket 14 at the vehicle body by means of fasteners such as bolts 8, 8 and nuts 15. The bracket 14 is fixed on the upper surface of the suspension frame 17 suspended on the side member 16 of the vehicle body B and the engine body E is elastically supported on the engine mounting apparatus 1 in the inverse letter V shape.

The large relative displacements in the A directions are generated between the engine body E and suspension rame 17 if the large-amplitude, low-frequency vibrations are generated at the engine body E due to the engine rolling motion or at the suspension frame 17 of the vehicle body B or due to recesses and convexes on the road surface.

The relative displacements cause the rubber block member 2 of the apparatus 1 to shear and cause the viscous fluid 11 hermetically sealed within the cavity 4 to be stirred so that the viscous fluid 11 flows through the respective gaps S, $S_1$ 'described above.

Consequently, since a viscous resistance force due to a stirring of the viscous fluid 11 and a flow path resistance force when the fluid 11 flows through the gaps S, $S_1$ 'are generated, the low-frequency vibration are remarkably damped due to such resistance forces.

NINTH PREFERRED EMBODIMENT

Figure 29:
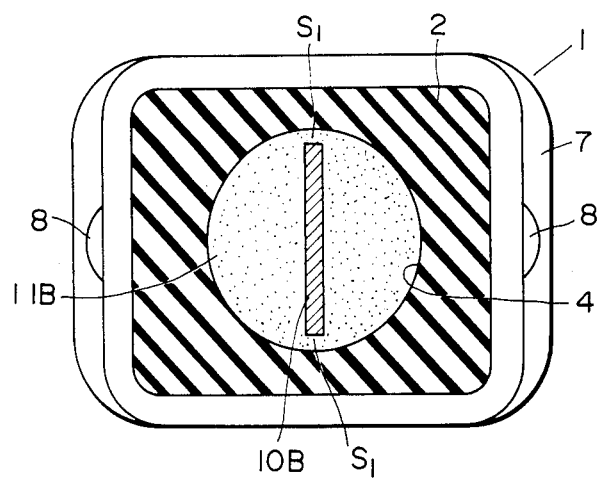
FIG. 29 is a cross sectional view of the vehicular engine mounting apparatus of a ninth preferred embodiment according to the present invention.

FIG. 29 shows a ninth preferred embodiment. A difference of the ninth preferred embodiment from the eighth preferred embodiment is that the cavity 4 having a substantially circular shape in the transverse section is formed on the rubber block member 2. The other structures are the same as those shown in FIGS. 25 through 28.

The vehicular engine mounting apparatus 1 according to the present invention described above with reference to each preferred embodiment has the following superior effects:

(1) Since the large amplitude, low-frequency vibrations generated at the engine body or vehicle body are remarkably damped due to the viscous shearing resistance force generated at the viscous shearing generator(s) constituted within the cavity 4 of the rubber block member, the transmission of the vibrations from the vehicular engine E to the vehicle body B or from the vehicle body B to the engine body E can remarkably be reduced through the engine mounting apparatus according to the present invention.

(2) Since pressure within the viscous fluid is not enhanced even though the resistance force is generated in the viscous fluid having the high viscosity, durability of the rubber block member is enhanced so that the performance of the apparatus is not reduced due to the reduction of durability.

(3) Since the viscous shearing resistance force of the viscous fluid is utilized, the mounting apparatus can be compacted with simple construction as compared with that utilizing a conventional orifice action.

It will clearly be understood by those skilled in the art that the foregoing description is made in terms of the preferred embodiments and various changes and modifications may be made without departing from the scope of the present invention which is to be defined by the appended claims.

What is claimed is:

1. An apparatus comprising:

(a) a first attachment member;
(b) a second attachment member;
(c) an elastic block member intervened between the first and second attachment members;
(d) a cavity in a form of an elongated groove extended within the elastic block member;
(e) a plate-like shearing resistance element, one end of which is fixed to the second attachment member and extended within the cavity;
(f) a viscous fluid having a relatively high viscosity and filled within the cavity of the elastic block member, so as to be present between a portion of the cavity and an opposing surface of the shearing resistance element, the viscous fluid generating a shearing resistance force dependent on vibration frequency along the opposing surface of the shearing resistance element in response to a relative displacement at constant speed between the resistance element and the wall surface of the cavity.

2. The apparatus according to claim 1, wherein said resistance element is disposed within the cavity with at least one relatively small gap held between its surface and an inner wall surface of part of the cavity.

3. The apparatus according to claim 2, wherein said resistance element is formed of an elastic body.

4. The apparatus according to claim 3, which further comprises a flat block plate and wherein said resistance element has substantially a letter U shape in a longitudinal section, the cavity is divided intoreof two partitioned cavities with openings at one end thereof at which one cavity is communicated with the other cavity, and one end of the resistance element is fixed to the block plate.

5. The apparatus according to claim 4, wherein said resistance element has a curved section curved substantially with the letter U-shaped in section at a center part thereof and two substantially trapezoidal plane sections at both ends thereof integrally formed with the curved section, the curved section being vulcanized and fixed to the block plate which serves to hermetically seal the viscous fluid.

6. The apparatus according to claim 4, wherein said resistance element has a curved section curved substantially in the letter U-shaped secton at a center part thereof and two substantially rectangular plane sections at both ends thereof integrally formed with the curved section, the curved section being vulcanized and fixed to the block plate.

7. The apparatus according to claim 3, wherein said second attachment member further comprises a flat block plate and wherein said resistance element has substantially a trapezoidal shape in a longitudinal section with a relatively small gap provided against an inner wall surface of the cavity and one end thereof is fixed to the block plate.

8. The apparatus according to claim 3, wherein said resistance element has a substantially rectangular shape in a longitudinal section with a relatively small gap provided against an inner wall surface of the cavity, the cavity having a substantially rectangular shape in a transverse section.

9. The apparatus according to claim 1, wherein said viscous fluid is hermetically sealed within the cavity.

10. The apparatus according to claim 1, wherein the first attachment member attaches the apparatus to a vehicular engine body and wherein the second attachment member attaches the apparatus to a vehicle body.

11. The apparatus according to claim 1, wherein said resistance element is formed of a spring characteristic steel plate.

12. The apparatus according to claim 11, wherein the spring steel plate has a curved section substantially in a letter U-shaped section at a center thereof and two substantially trapezoidal plane sections at both ends thereof integrally formed with the curved section, the curved section being welded to the second attachment member, and wherein the cavity has openings at one end thereof, toward which a cavity partitioning part of the block member is extended for partitioning the cavity into two, and at which one cavity is communicated with the other cavity.

13. The apparatus according to claim 1, wherein the cavity has substantially rectangular shapes in transverse and longitudinal sections.

14. The apparatus according to claim 1, wherein the cavity has a substantially rectangular shape in longitudinal section and a substantially circular shape in transverse section.

15. The apparatus according to claim 1, wherein the viscous fluid has a viscosity of 10,000 through 100,000 poise.

16. The apparatus according to claim 15, wherein the viscous fluid is polysiloxane.

17. The apparatus according to claim 1, wherein the viscous fluid is polyolefin.

18. An apparatus according to claim 1, wherein the relative displacement between the resistance element and the wall surface of the cavity is in a direction substantially parallel to the attachment members.

19. An apparatus for mounting a vehicular engine on a vehicle body, comprising:
(a) a first attachment member attached to the vehicular engine;
(b) a second attachment member attached to the vehicle body:
(c) an elastic block member intervened between the first and second attachment members for damping first vibrations having frequencies higher than a given value and having amplitudes lower than another given value, the first vibrations being generated when the vehicle runs at a considerable speed and the block member having a cavity therein; and
(d) means formed in the cavity of the block member for generating a viscous rsistance force against a shearing of the block member when the block member is sheared due to a transmission of second vibrations having frequencies lower than the given value and amplitudes larger than the other given value through the block member, the second vibrations being generated when the engine is started, idling, the vehicle is abruptly started and when the vehicle runs on recesses and convexes of a road surface.

20. The apparatus according to claim 19, wherein said means includes a hermetically sealed viscous fluid and a shearing force resistance member disposed within the cavity of the block member and having a given gap against an inner wall surface of the cavity.

* * * * *